Aug. 10, 1965        SHOKICHI FUJII           3,199,899
                      PIPE COUPLING
                    Filed Sept. 6, 1962
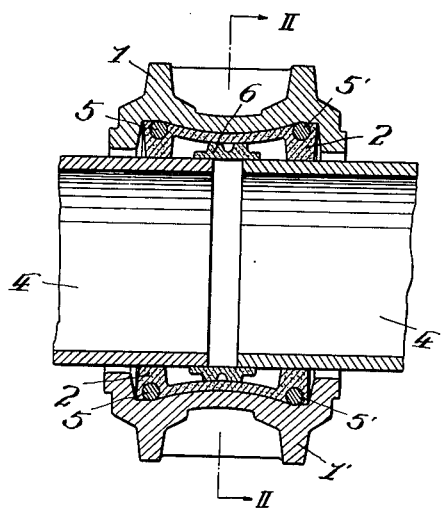
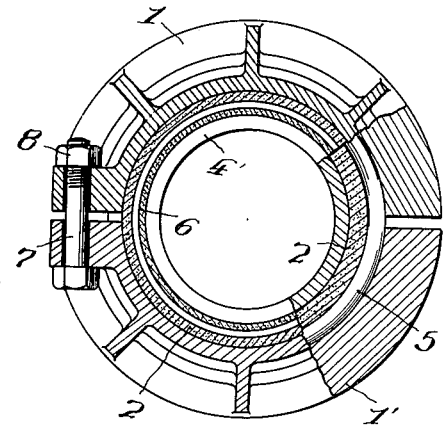
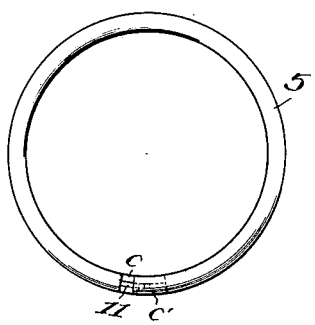
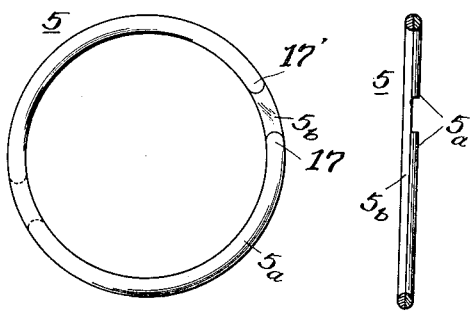
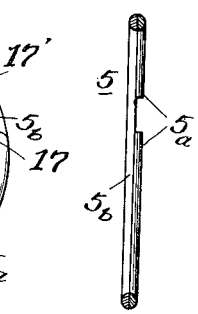
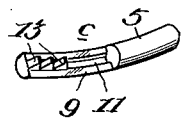
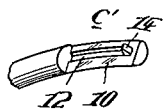
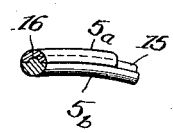
Shokichi Fujii
INVENTOR
George B. Onyevolle
BY
ATTORNEY Aug. 10, 1965
SHOKICHI FUJII
3,199,899
PIPE COUPLING
Filed Sept. 6, 1962
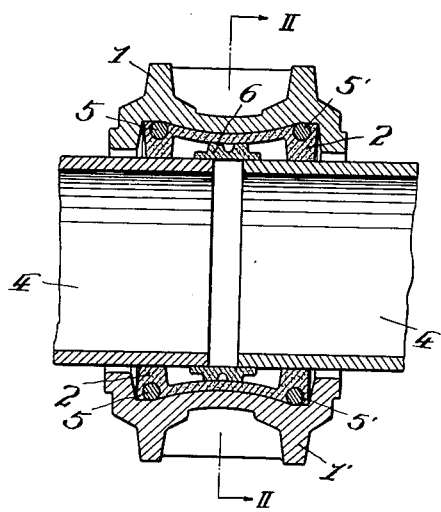
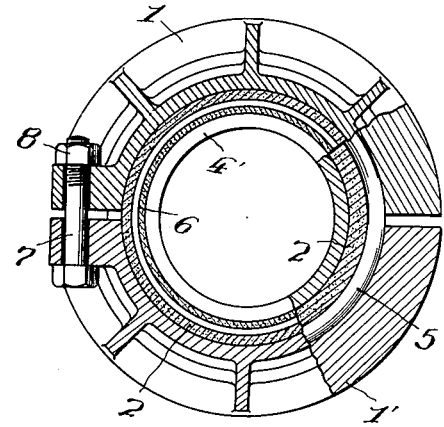
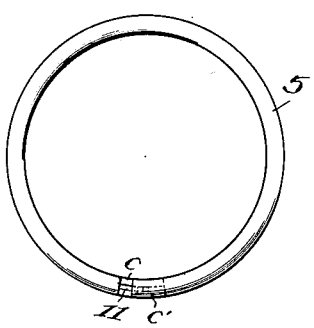
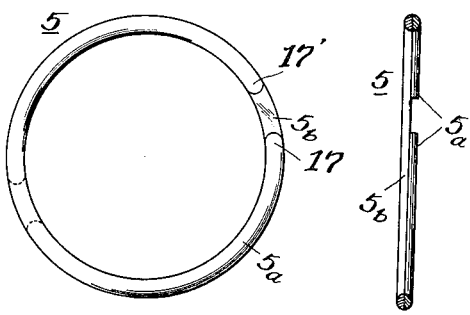
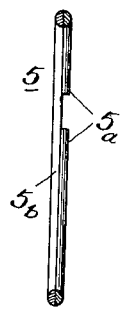
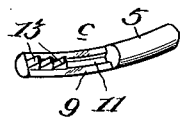
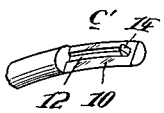
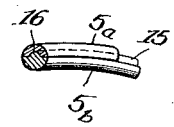
Shokichi Fujii
INVENTOR
George B. Onyewolle
BY
ATTORNEY United States Patent Office 3,199,899
Patented Aug. 10, 1965

3,199,899
PIPE COUPLING
Shokichi Fujii, 14 3-chome, Ogikuba, Suginami-ku,
Tokyo, Japan
Filed Sept. 6, 1962, Ser. No. 221,679
2 Claims. (Cl. 285—231)

This invention relates to couplings for joining aligned pipes, and more particularly to a novel and improved pipe coupling which has a wide applicability, and the principal advantages of which reside in lightness of the assembling materials, readiness in the coupling operation, establishment of a gas or water tight seal after said operation, and provision for flexibility at the pipe sections.

Heretofore, to join steel pipes, cast iron pipes or concrete pipes, there has been employed a method making use of a coupling comprising a pair of rubber packing rings and the engagement of pipes is carried out by locking the packing rings about the outer periphery of each of the pipe sections to be joined and deforming said rings by applying axial pressure thereto. The so-called sleeve type joint method, for example, belongs to this method. However, in this prior method, the rubber packing rings are so deformed by the application of a strong axial pressure that they often exceed the elastic limit of rubber.

The present invention contemplates a coupling member of a particular shape, i.e., a packing ring made of a resilient substance such as rubber or the like and provided at each end thereof with two wedge shaped leg portions extending inwardly. The bottom faces of each of the leg portions are adapted to be in face to face contact, not in line contact, with the outer periphery of each of the pipe sections to be engaged at the end portions thereof. It is one of the features of this invention that in locking the pipes with the packing ring, radial pressure is applied on the contacting face of the pipe and the leg portion of the packing ring at right angles thereto. It is also among the various features of the invention to insert rigid press rings into the shoulders defined by each end of the packing ring or the outermost portions of the leg portions so as to distribute on the contacting faces above mentioned as uniform a pressure as possible, said rigid press rings being partly exposed from the packing ring. By bolting the main housing which is of a sectional type and adapted to cover the packing ring and other associated parts, the pressure produced thereby will be applied equally to the leg portions through the press rings, thus enabling the bottom faces of the leg portions to be almost under a uniform pressure.

It is required that a press ring is reduced in diameter when a certain pressure is applied thereon. At the same time, it is also required that the both ends of the press rings are adapted to be doubled, said ends of the press rings being in confronting relation with respect to each other, just like those of a piston ring. For this purpose, three different methods as to the construction of the press ring are proposed in accordance with this invention, which at present are preferred and will be hereinafter fully explained.

For the purpose of allowing a certain degree of flexible movement of the pipes, the pipe sections are arranged in confronting relation with respect to each other so as to provide a spacing therebetween. Such pipe sections are engaged by means of a coupler comprising the main housing, packing ring and rigid press rings. When the interior of the pipes is held under a vacuum or there is a mere possibility that a vacuum is produced within the pipes depending upon the nature of use, the belt-like portion of the packing ring made of soft rubber is inclined to be sucked toward an opening located between the confronting pipe sections, and deformed due to the existing vacuum inside, thus causing the destruction and damage to the packing ring, or, more exactly speaking, to the whole device.

In order to overcome the deficiencies above pointed out, there is provided, in addition to the combination of the main housing, packing ring and rigid press rings already mentioned, a guard ring of sufficient thickness, which is adapted to be tightly fitted to the pipe sections so that it will seal the opening between the pipe sections outwardly thereof.

Accordingly, the principal object of this invention is to provide a novel and improved pipe coupling which can be used under low pressure within an elastic limit of rubber.

Further objects and advantages of this invention will appear as the specification proceeds, and the new and useful features of my pipe coupling will be fully defined in the appended claims.

The preferred form of the invention is illustrated in the accompanying drawing, in which:

FIG. 1 is a sectional elevation view of a pipe coupling in accordance with this invention;

FIG. 2 is a cross sectional view of the coupling taken along the line II—II of FIG. 1, with the portion partly broken away so as to illustrate a press ring;

FIG. 3 is a front view of the press ring;

FIG. 4A is an enlarged perspective view taken from the portion C of FIG. 3, illustrating a fragment of the press ring;

FIG. 4B is a view similar to FIG. 4A, illustrating a fragment of the press ring taken from the portion C' of FIG. 3;

FIG. 5 is a front view illustrating another form of the press ring;

FIG. 6 is a sectional elevation view of the press ring shown in FIG. 5; and

FIG. 7 is a perspective view, on an enlarged scale, of a fragment of a modification of the press ring as shown in FIG. 5.

Referring now to the accompanying drawing, reference numerals 1 and 1' designate a main housing of sectional type which is made of metal or any other suitable materials, and locked by means of bolts 7 and nuts 8 adapted to axially tighten the sectional housing 1 and 1' at two points opposite to each other. The housing of the above nature is applicable to pipes of relatively small diameter. But it should be understood that when pipes of relatively large diameter are to be coupled, more than three sectional housings may optionally be bolted to house the associated elements. The housing 1 and 1' is provided at the inside with a packing ring or coupling member 2 which is preferably in the form of belt, and the edges of which are bent and form leg portions projecting inwardly, said packing ring 2 being suitably made of a resilient substance such as rubber or the like. The bottom faces of the leg portions of the packing ring are in face contact with the outer periphery of respective pipes 4 and 4' in such a manner that the confronting pipe sections will keep its opening centrally of such contacting portions. In order to allow of a certain degree of flexibility to the engaging portion of the pipes, the pipes 4 and 4' are spaced so as to provide a narrow spacing therebetween.

The packing ring 2 is provided at each of its shoulders with grooves into which rigid press rings 5 and 5' are fitted into, said rigid press rings being made of metal or synthetic resinous materials such, for example, as hard polyethylene. Prior to the assembling operation of the rigid press rings, it is preferred that the grooves are coated with a lubricant such as soapsuds, so as to minimize or reduce friction between the packing ring 2 and the press rings 5 and 5'. The depth of each of the grooves is such that the outmost portion of the press ring when fitted into the respective grooves extends outside of the outer periphery of the packing ring. In other words, the press ring is partly exposed from the packing ring. The press rings 5 and 5' are made reducible in diameter when their exposed portion is depressed by the inner wall of the housing as the same is tightened by means of the bolts 7 and the nuts 8. The detailed constructional description of the press ring will be made fully hereinafter.

In the coupling constructed in accordance with the above method, the exposed portions of the rigid press rings 5 and 5' are pressed radially inwardly by the inner wall of the housing 1 and 1' owing to the bolting action of the bolts 7 and nuts 8. Then, due to the action of the press rings 5 and 5', the leg portions of the packing ring 2 will be pressed to the direction of the central axis of the pipes. Although each of the contacting portions between the bottom faces of the leg portions and the pipes covers relatively a small area, it is possible to hold a gas or water tight seal by applying pressure within the elastic limit of said leg portions, said gas or water tight seal being sufficient to yield to the inside gas or water pressure of the pipes. Moreover, frictional resistance of the leg portions being large at the bottom faces thereof, the leg portions will offer strong resistance to axial stresses, thus preventing the pipes from being disengaged. Through experience it has been found that radial pressure applied to the housing 1 and 1' is preferably at approximately 30% of the elastic limit of rubber. 70% of the remaining resilience of the material in an elastic limit will prolong the life of the packing ring, and furthermore, serve to give the joined pipe sections a proper flexibility without damaging its functional efficiency.

The function of the press rings should be especially noted. Even if the exposed portion of the respective press rings 5 and 5' may not be equally pressed by the housing 1 and 1', the provision of the press rings will serve to supply a uniform pressure on the whole contacting face between the packing ring and the pipes.

The belt-like portion of the packing ring according to this invention also has a particular advantage. Namely, as two leg portions of the packing ring are supported through the medium of said belt-like portion, the housing will not come in direct or indirect contact with the fluid within the pipes. Accordingly there is no danger that the inner face of the housing may be corroded by such fluid. Consequently, materials employed to form the housing can be optionally and suitably selected regardless of the material of the pipes and the nature of fluid used. Moreover, in case bending occurs about the pipe sections coupled, or bending is intentionally made, the leg portions of the packing ring will successively press-attach to the outer periphery of the pipes at right angles thereto with the aid of the belt-like portion that is made flexible, thus intercepting the contact between the housing and the fluid.

With regard to the structure of the press ring, three novel methods are proposed herein. According to the first method which is illustrated in FIGS. 3, 4A and 4B, a press ring is cut at one portion and comprises ends indicated by C and C', respectively. Said ends C and C' of the press ring are constructed in such a manner as to have a function of being doubled just like those of a piston ring, so as to form a successive circle of the press ring when they are doubled or coupled. Otherwise, such ends C and C' will irregularly be free of the predetermined path and project inwardly or outwardly of the packing ring and damage the same, and also cause an uneven pressure supply. As clearly shown in FIG. 4A of the drawing, one of the ends C and C', say the end C is provided with a projection 9 with a semicircular cross section, a groove 11 cut in the plain surface of said projection 9 axially with respect to the press ring, and teeth 13 mounted on the forward portion of the groove 11. FIG. 4B shows another end C' opposite to the end C, which comprises a projection 10 with a semicircular cross section, a groove 12, and a tooth 14 both provided in a manner similar to those forming the end C shown in FIG. 4A. By coupling those projections 9 and 10, each of the teeth will be fitted into the groove 11 or 12 opposite to each other. The press ring being of such construction, the teeth will only move along its opposite groove. Undesirable disengagement of the ends C and C' can thus be avoided.

According to the second method of constructing the press ring, the press ring is formed by merely providing two sub rings 5a and 5b having a substantially semicircular cross section and being of the same size and shape, which is shown in FIGS. 5 and 6. Each of said sub rings 5a and 5b is cut at one portion and provides ends 17 and 17' with a semicircular cross section, said ends 17 and 17' being suitably spaced from each other. When piling or doubling the sub rings 5a and 5b, the spacings between the ends of each of the sub rings are preferably located opposite to each other with respect to the center of the sub rings, as shown in both solid and dotted lines in FIG. 5. The press ring 5 thus formed is fitted into the groove cut in the shoulders of the packing ring 2. When the housing is locked by means of bolting, the press ring 5 consisting of two sub rings 5a and 5b is reduced in diameter and move only along said grooves by being guided thereby. Thus, the slipping off of the press rings from the packing ring can be almost prevented.

With respect to FIG. 7 illustrating the third method as to the construction of the press ring, the sub ring 5a has a groove 16 cut axially in the flat surface of the sub press ring 5a. While the sub ring 5b is provided with a projection 15 mounted axially on the flat surface thereof and adapted to slidably fit into said groove 16. Other constructional features of this press ring are similar to those of the press ring shown in FIGS. 5 and 6. Thus, it is possible to completely prevent the press ring from slipping off from the packing ring in the bolting operation of the main housing. Furthermore, the fixing operation of the press ring can be readily achieved.

The pipe coupling in accordance with this invention also comprises a guard ring 6 made of a thick rubber material or the like, which is located inside the packing ring and adapted to cover or seal an opening between the pipes to be coupled. Owing to the provision of said guard ring 6, the packing ring will not be affected by what exists within the pipes. When the inside of the pipes is held under a vacuum, only the guard ring 6 will be inclined to be sucked inwardly, and will effect a close sealing about the opening, thus preventing the packing ring from being sucked and deformed.

In accordance with the pipe coupling constructed in a manner herein described, each pipe section in a pipe line is capable of turning movement with respect to the other sections, which is especially useful in case of various earth movements, sudden shocks or internal stresses.

I claim:

1. A flexible, pipe-coupling arrangement for coupling two substantially axially aligned pipes comprising in combination:

a unitary elastomeric coupling member with an inner cylindrical wall having inwardly projecting flanges at both ends thereof, said flanges terminating in two axially extending faces, one of said flange faces resting on each pipe, and cylindrical grooves extending along each of the outer peripheral ends of the coupling member, a radius of each groove being normal to the axis and bisecting one of said faces, said grooves being sized to partially receive flexible cylindrical ring means therein and being located substantially equally distant from the center of said coupling member;

flexible cylindrical ring means disposed and retained in said grooves, the outermost portion of said ring means partially extending radially outward from the outer periphery of said coupling member, said ring means including telescoping guide means;

and, a sectional housing consisting of at least two sections adapted to completely encircle said pipes, each of said sections having inwardly projecting legs at both ends thereof and an axially extending web sized to snugly encompass the outer periphery of said coupling member and said ring means and including adjustable fastening means to fasten said closure firmly, contracting said ring means on said coupling member, said inwardly projecting legs diverging axially outwardly from the outer margins of said coupling member so as to afford a clearance therebetween to permit said leg portions to pivot about said rings in response to pressure differences exerted on said elastomeric coupling member.

2. An arrangement as claimed in claim 1, including, a resilient cylindrical guard within said coupling member extending between said coupling member flanges and over the two pipes to be joined.

References Cited by the Examiner

UNITED STATES PATENTS

| | | | |
|---|---|---|---|
| 705,196 | 7/02 | Bergmann | 63—15.5 X |
| 1,063,996 | 6/13 | Moore | 285—372 X |
| 1,978,453 | 10/34 | Flynn | 285—351 X |
| 2,003,918 | 6/35 | Brown | 285—321 X |
| 2,250,286 | 7/41 | White | 285—321 X |
| 2,669,465 | 2/54 | Newell | 285—53 |
| 2,937,037 | 5/60 | Woolsey | 285—233 |
| 2,944,840 | 7/60 | Wiltse | 285—369 X |

FOREIGN PATENTS 10,839  4/24  Netherlands.

CARL W. TOMLIN, *Primary Examiner.*